(12) United States Patent
Sakai et al.

(10) Patent No.: US 10,326,582 B2
(45) Date of Patent: Jun. 18, 2019

(54) OPTICAL TRANSMITTER THAT INCLUDES OPTICAL MODULATOR

(71) Applicant: FUJITSU LIMITED, Kawasaki-shi, Kanagawa (JP)

(72) Inventors: Yasufumi Sakai, Fuchu (JP); Takayuki Shibasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/922,985

(22) Filed: Mar. 16, 2018

(65) Prior Publication Data

US 2018/0316483 A1 Nov. 1, 2018

(30) Foreign Application Priority Data

Apr. 27, 2017 (JP) .................. 2017-087884

(51) Int. Cl.
*H04B 10/04* (2006.01)
*H04L 7/00* (2006.01)
(Continued)

(52) U.S. Cl.
CPC ............ *H04L 7/0075* (2013.01); *G02F 1/225* (2013.01); *H04B 10/505* (2013.01); *H04B 10/516* (2013.01); *G02F 2001/212* (2013.01)

(58) Field of Classification Search
CPC ................ H04B 10/516; H04B 10/505; H04B 10/5051; H04B 10/5053; H04B 10/5161; H04B 10/50575; H04B 10/50577; H04B 10/677; H04B 10/5055; H04L 7/0075; H04L 27/34; H04L 27/36; H04L 7/0037; G02F 1/225; G02F 2001/212; H04J 14/06;
(Continued)

(56) References Cited

U.S. PATENT DOCUMENTS 7,945,173 B2 * 5/2011 Akiyama .............. G02F 1/0121
398/198
9,122,084 B2 * 9/2015 Ono .......................... G02F 1/01
(Continued)

FOREIGN PATENT DOCUMENTS

JP 2003-218790 7/2003
JP 2014-138361 7/2014

OTHER PUBLICATIONS

David Patel, et al., Design, analysis, and transmission system performance of a 41 GHz silicon photonic modulator, Optics express May 22, 2015 (25 pages).
(Continued)

*Primary Examiner* — Hibret A Woldekidan
(74) *Attorney, Agent, or Firm* — Fujitsu Patent Center

(57) ABSTRACT

An optical transmitter includes: an optical modulator, a phase adjustment circuit, first and second synchronization circuits, and first and second drive circuits. The optical modulator includes a first modulation area and a second modulation area that is provided at output side of the first modulation area. The phase adjustment circuit adjusts a phase of a first clock signal so as to generate a second clock signal. The first and second synchronization circuits respectively output first and second electric signals in synchronization with the first and second clock signals. The first and second drive circuits respectively drive the first and second modulation areas with the first and second electric signals.

5 Claims, 15 Drawing Sheets

(51) Int. Cl.
*G02F 1/225* (2006.01)
*H04B 10/516* (2013.01)
*H04B 10/50* (2013.01)
*G02F 1/21* (2006.01)

(58) Field of Classification Search
CPC .............. H04J 3/0602; H04J 3/0685; H04Q 2011/0045; H04Q 2213/13361
USPC ....... 398/182, 183, 185, 186, 188, 189, 191, 398/192, 193, 198, 154
See application file for complete search history.

(56) References Cited

U.S. PATENT DOCUMENTS

| | | | | |
|---|---|---|---|---|
| 9,217,883 | B2* | 12/2015 | Kato | G02F 1/011 |
| 9,391,710 | B2* | 7/2016 | Satoh | H04B 10/516 |
| 9,860,053 | B2* | 1/2018 | Ishaug | H04B 10/5161 |
| 10,090,921 | B2* | 10/2018 | Yoneyama | H04B 10/50575 |
| 2004/0190911 | A1* | 9/2004 | Franco | H04B 10/25077 398/189 |
| 2004/0213580 | A1 | 10/2004 | Masuda et al. | |
| 2007/0089026 | A1* | 4/2007 | Uchida | H04L 27/2096 714/758 |
| 2015/0063825 | A1* | 3/2015 | Yamase | H04B 10/5053 398/154 |
| 2015/0229406 | A1* | 8/2015 | Akiyama | G02F 1/0123 398/65 |
| 2016/0062207 | A1* | 3/2016 | Bai | G02F 1/225 385/3 |

OTHER PUBLICATIONS

Chi Xiong, et al., A Monolithic 56 Gb/s CMOS Integrated Nanophotonic PAM-4 Transmitter, Optical Interconnects Conference 2015 (2 pages).

Frederic Boeuf, et al., Silicon Photonics R&D and Manufacturing on 300-mm Wafer Platform, Journal of Lightwave Technology, vol. 34, No. 2, Jan. 15, 2016 (10 pages).

* cited by examiner

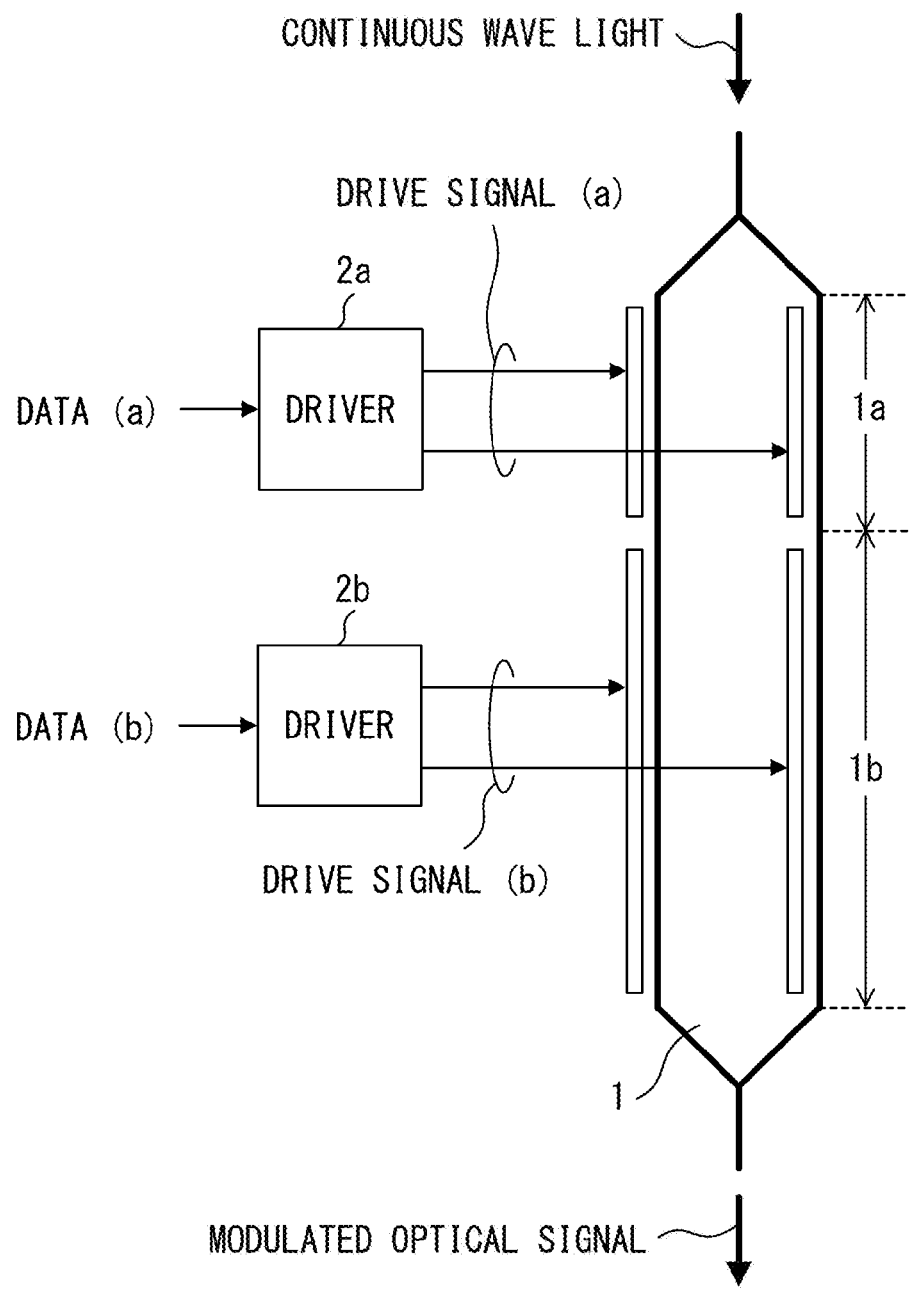
F I G. 1

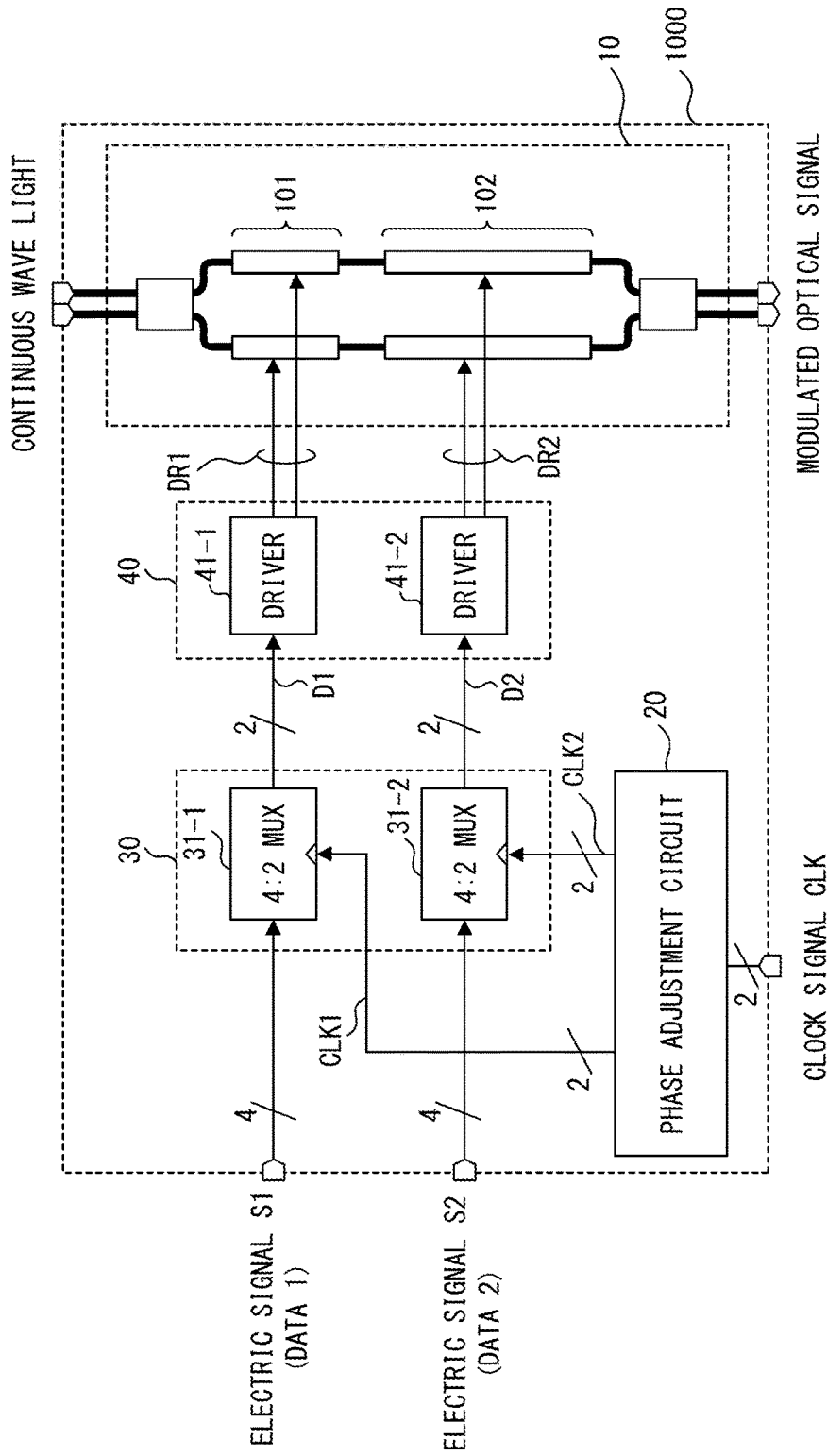
F I G. 2

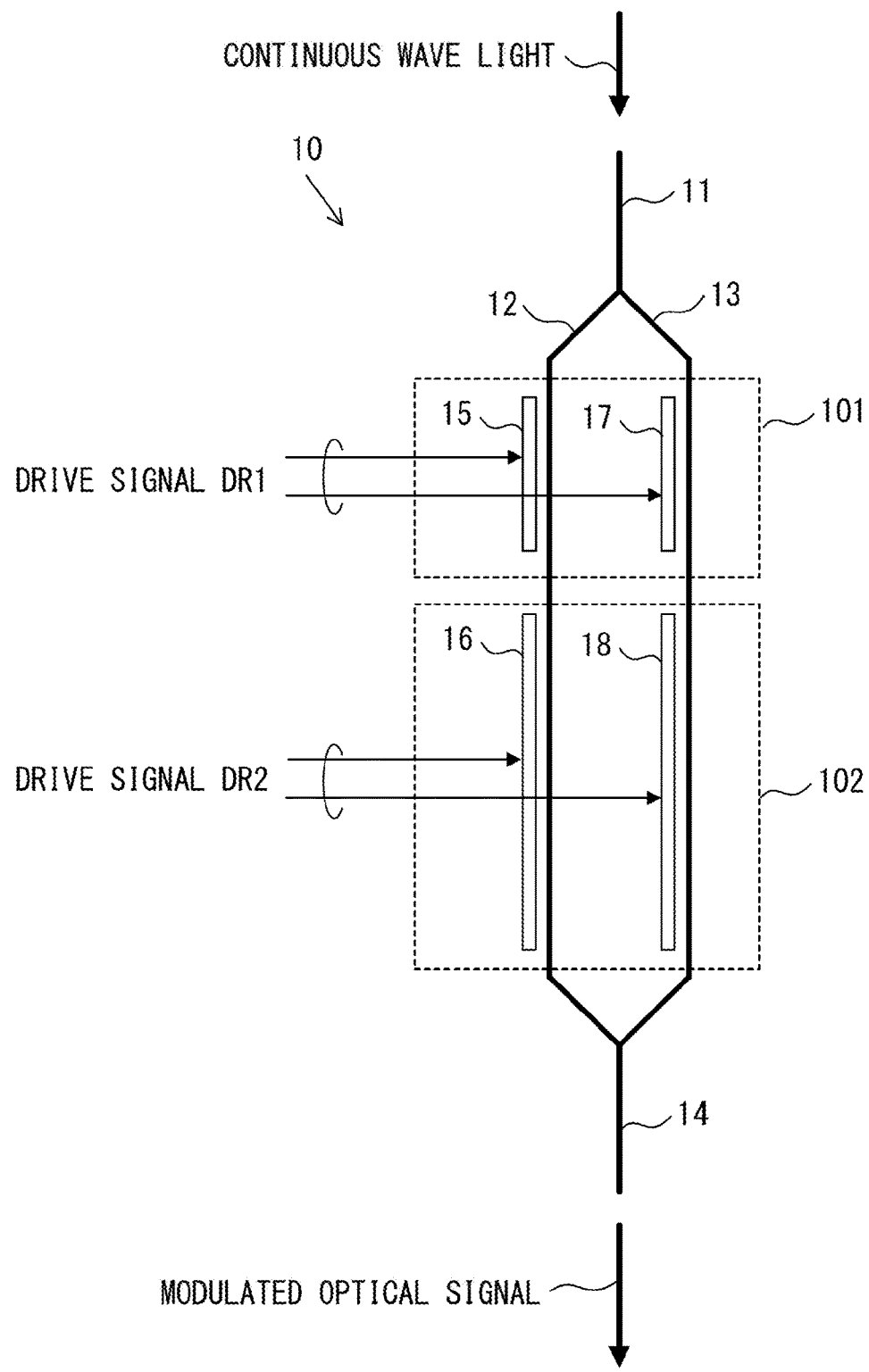
F I G. 3

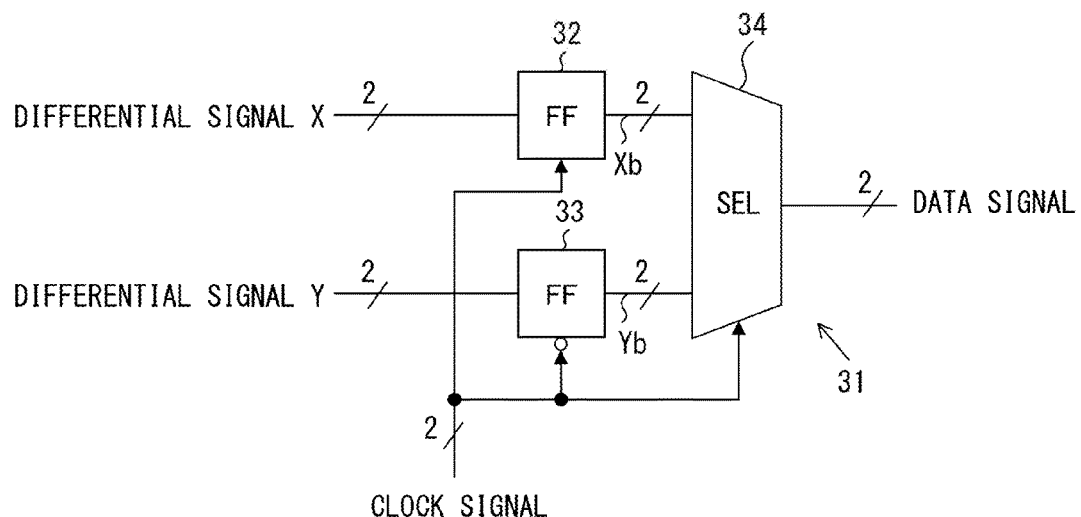
F I G. 4 A
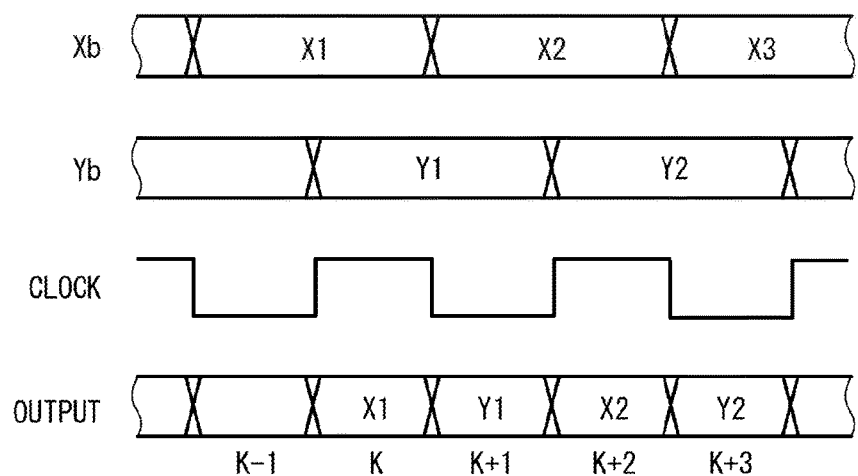
F I G. 4 B

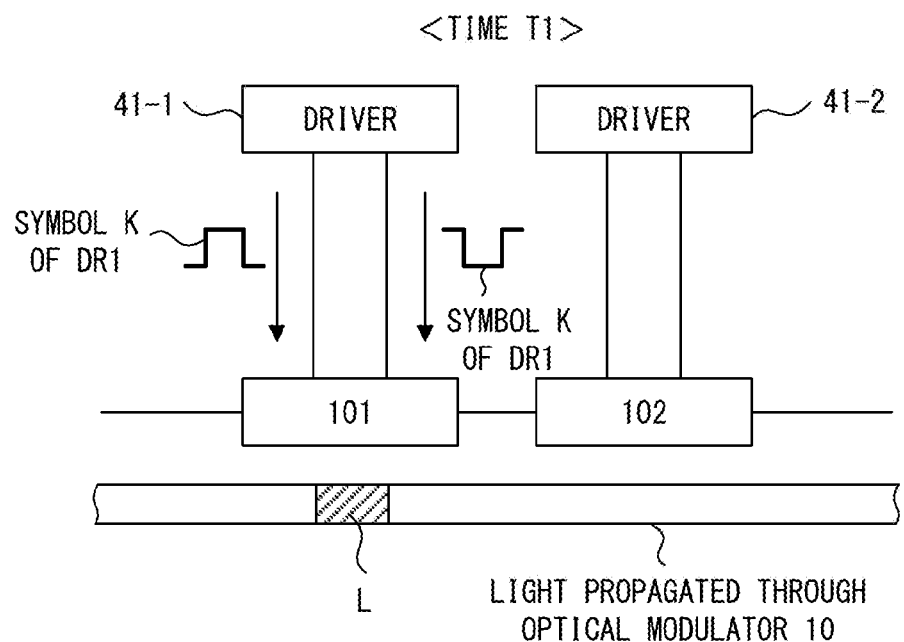
F I G. 6 A
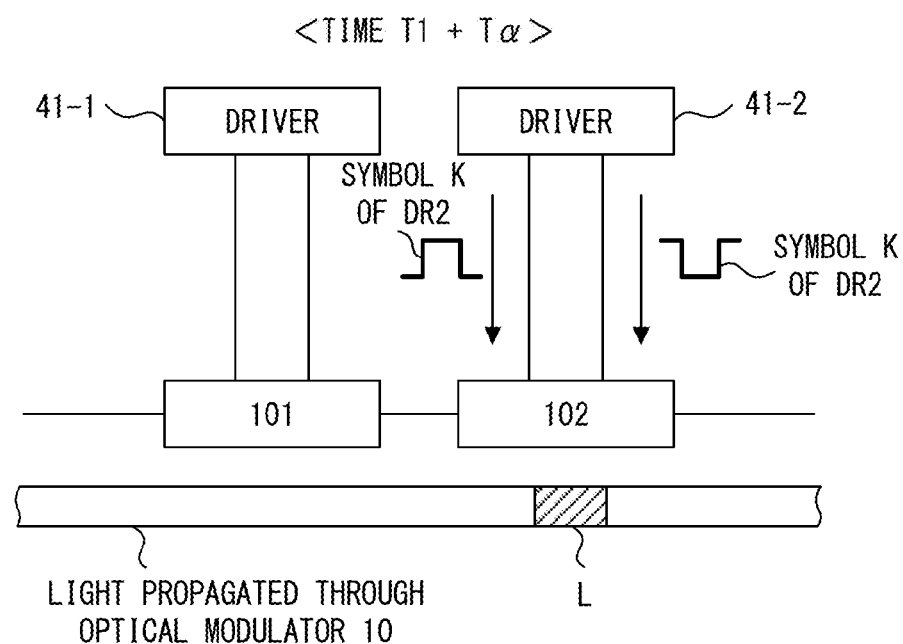
F I G. 6 B

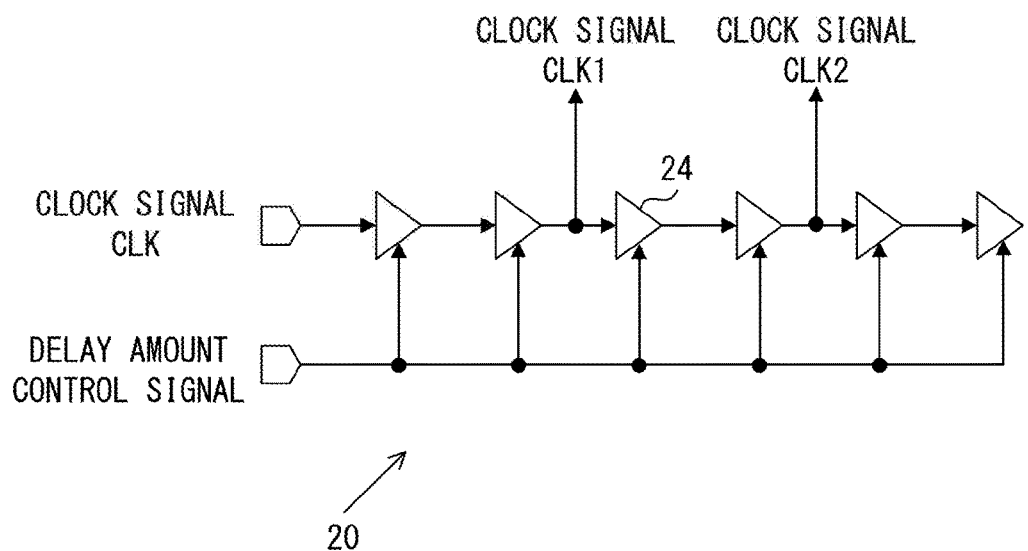
F I G. 1 0 A
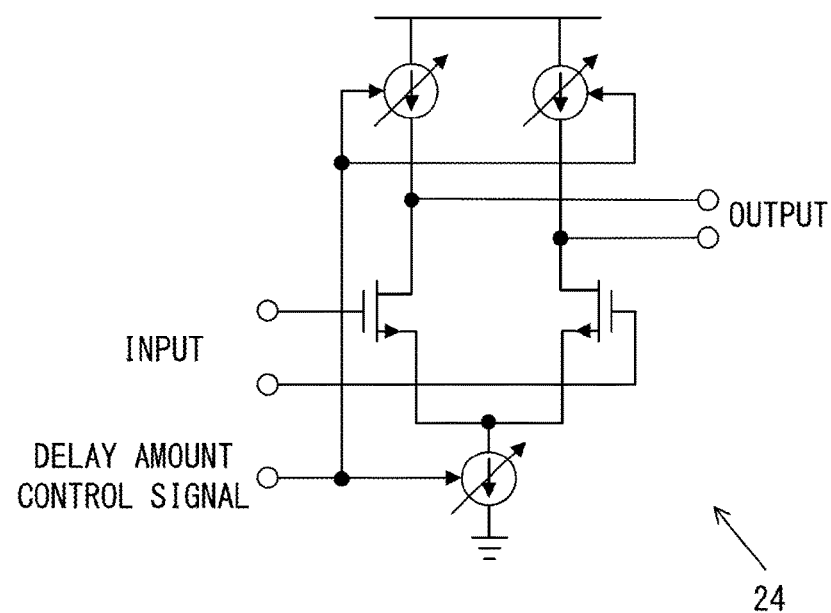
F I G. 1 0 B

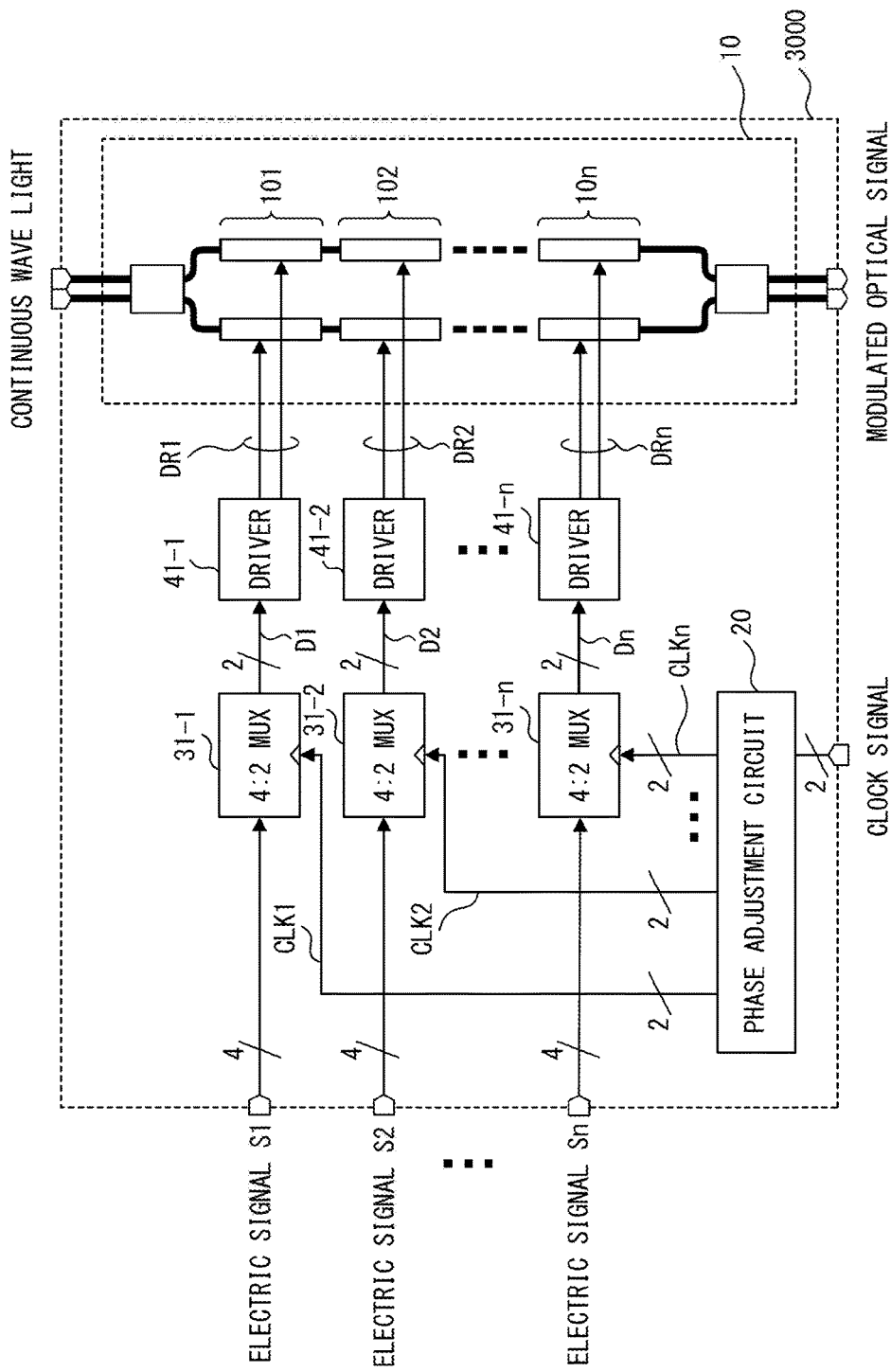
F I G. 13

OPTICAL TRANSMITTER THAT INCLUDES OPTICAL MODULATOR

CROSS-REFERENCE TO RELATED APPLICATION

This application is based upon and claims the benefit of priority of the prior Japanese Patent Application No. 2017-087884, filed on Apr. 27, 2017, the entire contents of which are incorporated herein by reference.

FIELD

The embodiments discussed herein are related to an optical transmitter that includes an optical modulator driven by a plurality of electric signals.

BACKGROUND

An optical transmitter including a Mach-Zehnder modulator driven by an electric signal is known as an example of an optical transmitter that provides a high-speed data communication (for example, Japanese Laid-open Patent Publication No. 2014-138361 and Document 1). Continuous wave light is input to the Mach-Zehnder modulator. Then, a modulated optical signal is generated by driving the Mach-Zehnder modulator with an electric signal indicating transmission data.

FIG. 1 illustrates an example of an optical transmitter including a Mach-Zehnder modulator. In this example, the optical transmitter includes a Mach-Zehnder modulator 1, a driver 2a, and a driver 2b. A modulation area of the Mach-Zehnder modulator 1 is divided into a plurality of modulation areas. In the example illustrated in FIG. 1, the Mach-Zehnder modulator 1 includes a modulation area 1a and a modulation area 1b. Non-modulated continuous wave light is input to the Mach-Zehnder modulator 1. The driver 2a generates a drive signal (a) from data (a), and the driver 2b generates a drive signal (b) from data (b). Then, the drive signal (a) and the drive signal (b) are respectively applied to the modulation area 1a and the modulation area 1b. This configuration provides a pulse-amplitude modulation (PAM) that transmits the data (a) and the data (b). In the configuration illustrated in FIG. 1, 4-level pulse-amplitude modulation (PAM4) is provided if the length of the modulation area 1b is twice the length of the modulation area 1a (for example, Document 2).

In 4-level pulse-amplitude modulation, for example, the following optical amplitudes A are obtained for a combination of data (a) and data (b).
"a=0, b=0": "A=0"
"a=1, b=0": "A=1"
"a=0, b=1": "A=2"
"a=1, b=1": "A=3"

It is assumed that, in the optical transmitter illustrated in FIG. 1, the drive signals (a) and (b) are given to the Mach-Zehnder modulator 1 at the same timing. However, light input to the Mach-Zehnder modulator 1 passes through the modulation area 1a and then passes through the modulation area 1b. Thus, the timing at which the input light is modulated by the drive signal (b) in the modulation area 1b is shifted, by a light propagation delay time τ, with respect to the timing at which the input light is modulated by the drive signal (a) in the modulation area 1a. τ depends on the length of the modulation area 1a. The strength to modulate an optical signal depends on the strength of a drive signal. Thus, the waveform of a modulated optical signal output from the Mach-Zehnder modulator 1 will be distorted if the timings at which input light is modulated are different.

This problem may be solved if a drive signal (b) output from the driver 2b is delayed by a time τ with respect to a drive signal (a). Delaying an electric signal given to a Mach-Zehnder modulator is disclosed in, for example, Document 3. Further, an optical transmitter that can operate normally even if a data-transmission speed varies is disclosed in, for example, Japanese Laid-open Patent Publication No. 2003-218790.

REFERENCES

Document 1: David Patel, et al., Design, analysis, and transmission system performance of a 41 GHz silicon photonic modulator, Optics express 2015

Document 2: Chi Xiong, et al., A Monolithic 56 Gb/s CMOS Integrated Nanophotonic PAM-4 Transmitter, Optical Interconnects Conference 2015

Document 3: Frederic Boeuf, et al., Silicon Photonics R&D and Manufacturing on 300-mm Wafer Platform, journal of lightwave technology, Vol. 34, No. 2, Jan. 15, 2016

However, in conventional technologies (for example, a technology disclosed in Document 3), an electric signal output from a driver is delayed directly. Specifically, the timing of applying, to each modulation area, an electric signal output from a driver is adjusted by changing the number of amplifiers through which the electric signal passes. Alternatively, the timing of applying, to each modulation area, an electric signal output from a driver is adjusted by changing the length of a transmission line through which the electric signal passes. Thus, the waveform of an electric signal (the drive signals (a) and (b) in FIG. 1) applied to a Mach-Zehnder modulator is deteriorated due to bandwidth of an amplifier or a transmission line. In this case, the waveform of a modulated optical signal output from the Mach-Zehnder modulator 1 may also be deteriorated.

SUMMARY

According to an aspect of the present invention, an optical transmitter includes: an optical modulator equipped with a first arm and a second arm, the first arm including a first modulation area and a second modulation area that is provided at output side of the first modulation area, and the second arm including a third modulation area and a fourth modulation area respectively corresponding to the first modulation area and the second modulation area; a phase adjustment circuit configured to adjust a phase of a first clock signal so as to generate a second clock signal; a first synchronization circuit configured to output a first electric signal in synchronization with the first clock signal; a second synchronization circuit configured to output a second electric signal in synchronization with the second clock signal; a first drive circuit configured to drive the first modulation area and the third modulation area with the first electric signal output from the first synchronization circuit; and a second drive circuit configured to drive the second modulation area and the fourth modulation area with the second electric signal output from the second synchronization circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an optical transmitter that includes a Mach-Zehnder modulator;

FIG. 2 illustrates an example of an optical transmitter according to a first embodiment of the present invention;

FIG. 3 illustrates an example of an optical modulator;

FIGS. 4A and 4B illustrate examples of a configuration and an operation of a multiplexer;

FIGS. 6A and 6B illustrate an example of an operation of the optical modulator;

FIGS. 7, 8, 9, 10A, 10B, and 11 illustrate examples of a phase adjustment circuit;

FIG. 13 illustrates an example of an optical transmitter according to a third embodiment of the present invention;

DESCRIPTION OF EMBODIMENTS

First Embodiment

Figure 5:
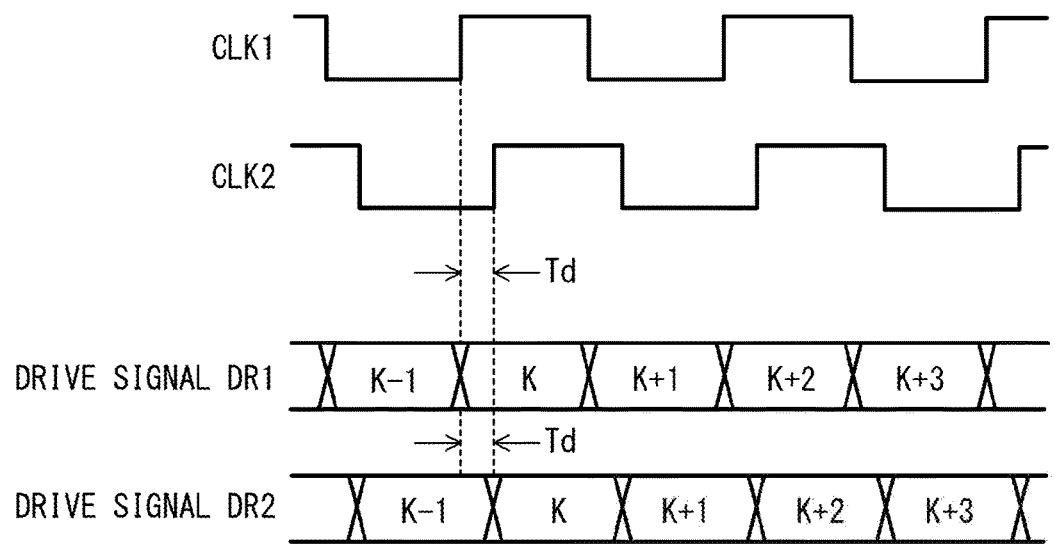
FIG. 5 illustrates a delay of a drive signal.

FIG. 2 illustrates an example of an optical transmitter according to a first embodiment of the present invention. As illustrated in FIG. 2, an optical transmitter 1000 according to the first embodiment includes an optical modulator 10, a phase adjustment circuit 20, a multiplexer circuit 30, and a drive circuit 40. The optical transmitter 1000 may include other circuit elements not illustrated in FIG. 2.

For example, non-modulated continuous wave light is input to the optical transmitter 1000. Continuous wave light is generated by a light source (not illustrated). This light source is implemented by, for example, a laser source that generates continuous wave light of a specified wavelength. Further, a clock signal CLK is input to the optical transmitter 1000. A clock signal is generated by a clock signal generation circuit (not illustrated). The frequency of a clock signal is determined, for example, according to a bit rate of data transmitted by the optical transmitter 1000. Further, an electric signal S1 that indicates data 1 and an electric signal S2 that indicates data 2 are input to the optical transmitter 1000. In this example, the electric signal S1 and the electric signal S2 are respectively parallel signals that transmit a plurality of bit streams. The optical transmitter 1000 generates a modulated optical signal based on the electric signal S1 and the electric signal S2.

In this example, the optical modulator 10 is implemented by the Mach-Zehnder modulator illustrated in FIG. 3. Specifically, the optical modulator 10 includes an input optical waveguide 11, a first arm optical waveguide 12, a second arm optical waveguide 13, and an output optical waveguide 14. The input optical waveguide 11 guides input continuous wave light to the first arm optical waveguide 12 and the second arm optical waveguide 13. Light propagated through the first arm optical waveguide 12 and light propagated through the second arm optical waveguide 13 are combined and guided to the output optical waveguide 14. Here, the input continuous wave light is modulated in the first arm optical waveguide 12 and the second arm optical waveguide 13. As a result, a modulated optical signal is generated.

A drive signal DR1 and a drive signal DR2 are applied to the optical modulator 10. In this example, the drive signal DR1 and the drive signal DR2 are respectively differential signals, which will be described later.

Signal electrodes 15 and 16 are formed near the first arm optical waveguide 12. Here, the signal electrode 16 is formed at the output side of the signal electrode 15. The drive signal DR1 is applied to the signal electrode 15, and the drive signal DR2 is applied to the signal electrode 16. Thus, light propagated through the first arm optical waveguide 12 is modulated by the drive signal DR1 applied to the signal electrode 15, and is modulated by the drive signal DR2 applied to the signal electrode 16. Likewise, signal electrodes 17 and 18 are formed near the second arm optical waveguide 13. Here, the signal electrode 18 is formed at the output side of the signal electrode 17. The drive signal DR1 is applied to the signal electrode 17, and the drive signal DR2 is applied to the signal electrode 18. Thus, light propagated through the second arm optical waveguide 13 is modulated by the drive signal DR1 applied to the signal electrode 17, and is modulated by the drive signal DR2 applied to the signal electrode 18. In FIG. 3, a bias electrode that adjusts an operating point of the optical modulator 10 is omitted.

A drive signal DR1 is applied to the signal electrodes 15 and 17. Here, the drive signal DR1 is a differential signal and is formed by a pair of equal and opposite signals. One of the pair of the signals in the drive signal DR1 is applied to the signal electrode 15 and the other one of the pair of the signals in the drive signal DR1 is applied to the signal electrode 17. Thus, the first arm optical waveguide 12, the second arm optical waveguide 13, and the signal electrodes 15 and 17 configure a modulation unit 101. Note that the length of the signal electrode 15 and the length of the signal electrode 17 are the same as each other.

Likewise, a drive signal DR2 is applied to the signal electrodes 16 and 18. Here, the drive signal DR2 is also a differential signal and is formed by a pair of equal and opposite signals. One of the pair of the signals in the drive signal DR2 is applied to the signal electrode 16 and the other one of the pair of the signals in the drive signal DR2 is applied to the signal electrode 18. Thus, the first arm optical waveguide 12, the second arm optical waveguide 13, and the signal electrodes 16 and 18 configure a modulation unit 102. Note that the length of the signal electrode 16 and the length of the signal electrode 18 are the same as each other. In addition, in this example, the lengths of the signal electrodes 16 and 18 are respectively twice the lengths of the signal electrodes 15 and 17 in order to provide PAM4.

As described above, the optical modulator 10 illustrated in FIG. 3 includes the modulation unit 101 and the modulation unit 102. With respect to the first arm, a modulation area for the modulation unit 101 is formed near the signal electrode 15, and a modulation area for the modulation unit 102 is formed near the signal electrode 16. With respect to the second arm, a modulation area for the modulation unit 101 is formed near the signal electrode 17, and a modulation area for the modulation unit 102 is formed near the signal electrode 18.

A clock signal CLK is input to the phase adjustment circuit 20. The phase adjustment circuit 20 generates a clock signal CLK1 and a clock signal CLK2 based on the clock signal CLK. The clock signal CLK2 is delayed by a time Td with respect to the clock signal CLK1. In other words, the phase of the clock signal CLK2 is delayed, by a phase φ, with respect to the phase of the clock signal CLK1. The phase φ corresponds to the time Td. The clock signal CLK2 may be generated by delaying the clock signal CLK1 by the time Td.

The time Td corresponds to a difference between a time needed to propagate light from an input end of the optical modulator 10 to the modulation area 101, and a time needed to propagate light from the input end of the optical modulator 10 to the modulation area 102. Alternatively, the time Td corresponds to a propagation delay time that occurs by the arrival of light input to the optical modulator 10 at the modulation unit 102. In other words, the time Td corresponds to a time needed for input light to pass through the modulation unit 101. An example of the phase adjustment circuit 20 will be described later.

The multiplexer circuit 30 includes a multiplexer 31-1 and a multiplexer 31-2. The multiplexer 31-1 multiplexes an electric signal S1 so as to generate a data signal D1. Here, the electric signal S1 is configured by two differential signals that are transmitted in parallel. In other words, the electric signal S1 is a 4-lane parallel signal. Then, the multiplexer 31-1 time-division multiplexes the two differential signals included in the electric signal S1 and outputs the data signal D1. Likewise, the multiplexer 31-2 multiplexes an electric signal S2 so as to generate a data signal D2. Here, the electric signal S2 is also configured by two differential signals that are transmitted in parallel. In other words, the electric signal S2 is also a 4-lane parallel signal. Then, the multiplexer 31-2 time-division multiplexes the two differential signals included in the electric signal S2 and outputs the data signal D2. Each of the data signals D1 and D2 is a differential signal.

FIGS. 4A and 4B illustrate examples of a configuration and an operation of a multiplexer. A multiplexer 31 illustrated in FIG. 4A corresponds to the multiplexers 31-1 and 31-2 illustrated in FIG. 2. The multiplexers 31-1 and 31-2 have substantially the same configuration and perform substantially the same operation.

The multiplexer 31 includes flip-flop circuits 32 and 33, and a selector 34. Electric signals (the electric signal S1 or the electric signal S2 illustrated in FIG. 2) are input to the multiplexer 31. The electric signals are configured by a differential signal X and a differential signal Y.

The differential signal X is input to a data terminal of the flip-flop circuit 32. The flip-flop circuit 32 holds a signal given to its data terminal using a rising edge of a clock signal. On the other hand, the differential signal Y is input to a data terminal of the flip-flop circuit 33. The flip-flop circuit 33 holds a signal given to its data terminal using a falling edge of the clock signal. The selector 34 selects an output signal of the flip-flop circuit 32 when the state of a clock signal is H level, and selects an output signal of the flip-flop circuit 33 when the state of the clock signal is L level.

FIG. 4B is a timing chart of the multiplexer 31 illustrated in FIG. 4A. In this example, a differential signal Xb and a differential signal Yb are alternately output from the flip-flop circuits 32 and 33 in synchronization with a clock signal. Specifically, the differential signal Xb is output in synchronization with a rising edge of a clock signal, and the differential signal Yb is output in synchronization with a falling edge of the clock signal. In other words, the differential signal Xb and the differential signal Yb are time-division multiplexed. As a result, symbols K, K+1, K+2, K+3, . . . of a data signal output from the multiplexer 31 respectively transmit X1 in the differential signal Xb, Y1 in the differential signal Yb, X2 in the differential signal Xb, Y2 in the differential signal Yb, . . . . As described above, the multiplexer 31 operates as a synchronization circuit that controls output timings of differential signals.

The drive circuit 40 includes a driver 41-1 and a driver 41-2. The driver 41-1 generates a drive signal DR1 based on the data signal D1 output from the multiplexer 31-1. Likewise, the driver 41-2 generates a drive signal DR2 based on the data signal D2 output from the multiplexer 31-2. Each of the drive signals DR1 and DR2 is a differential signal.

FIG. 5 illustrates a delay of a drive signal. In the optical transmitter 1000, a clock signal CLK2 is delayed by a time Td with respect to a clock signal CLK1, as illustrated in FIG. 5. The multiplexer 31-1 multiplexes the electric signal S1 in synchronization with the clock signal CLK1, and the multiplexer 31-2 multiplexes the electric signal S2 in synchronization with the clock signal CLK2. The driver 41-1 generates a drive signal DR1 from an output signal of the multiplexer 31-1, and the driver 41-2 generates a drive signal DR2 from an output signal of the multiplexer 31-2. Therefore, the drive signal DR2 is delayed by the time Td with respect to the drive signal DR1.

The drive signal DR1 is given to the modulation unit 101 of the optical modulator 10. Specifically, as illustrated in FIG. 3, one of a pair of signals in the differential drive signal DR1 (for example, a non-inverted signal) is applied to the electrode 15 that is formed near the first arm optical waveguide 12, and the other one of the pair of signals in the differential drive signal DR1 (for example, an inverted signal) is applied to the electrode 17 that is formed near the second arm optical waveguide 13. In addition, the drive signal DR2 is given to the modulation unit 102 of the optical modulator 10. Specifically, as illustrated in FIG. 3, one of a pair of signals in the differential drive signal DR2 (for example, a non-inverted signal) is applied to the electrode 16 that is formed near the first arm optical waveguide 12, and the other one of the pair of signals in the differential drive signal DR2 (for example, an inverted signal) is applied to the electrode 18 that is formed near the second arm optical waveguide 13.

In the optical transmitter 1000 having the configuration described above, a drive signal DR1 is generated based on data 1, and input light is modulated by this drive signal DR1. In addition, a drive signal DR2 is generated based on data 2, and the input light is further modulated by this drive signal DR2. Thus, a modulated optical signal generated by the optical modulator 10 can transmit the data 1 and the data 2. Here, a symbol of the data 1 and a symbol of the data 2 are multiplexed in each symbol of this modulated optical signal. In the example illustrated in FIG. 5, a symbol K of the drive signal DR1 and a symbol K of the drive signal DR2 are multiplexed so that a symbol K of the modulated optical signal is generated.

Here, the timing at which input light of the optical modulator 10 arrives at the modulation unit 102 is delayed by a time Td with respect to the timing at which the input light arrives at the modulation unit 101. However, in the optical transmitter 1000 illustrated in FIG. 2, the clock signal CLK2 is delayed by the time Td with respect to the clock signal CLK1. In this case, the drive signal DR2 generated in synchronization with the clock signal CLK2 is delayed by the time Td with respect to the drive signal DR1 in synchronization with the clock signal CLK1. Thus, a modulation by the drive signal DR1 and a modulation by the drive signal DR2 can be accurately superimposed on each other in the optical modulator 10. As a result, the characteristics of a modulated optical signal output from the optical modulator 10 are improved. For example, the opening of an eye pattern of a modulated optical signal becomes wider.

FIGS. 6A and 6B illustrate an example of an operation of the optical modulator 10. In this example, it is assumed that a light component L passing through the modulation unit 101 at a time T1 passes through the modulation unit 102 at a time T1+Td. It is also assumed that a symbol of a data signal D1 output from the multiplexer 31-1 and a symbol of a data signal D2 output from the multiplexer 31-2 are multiplexed by PAM4 so that a symbol of a modulated optical signal is generated.

As illustrated in FIG. 6A, a drive signal DR1 representing a symbol K of the data signal D1 is applied to the modulation unit 101 at the time T1. By doing this, the light component L is modulated in the modulation unit 101 by the drive signal DR1 representing a symbol K of the data signal D1.

As illustrated in FIG. 6B, the light component L arrives at the modulation unit 102 at the time T1+Td. Here, a drive signal DR2 is delayed by a time Td with respect to the drive signal DR1. Thus, the drive signal DR2 representing a symbol K of the data signal D2 is applied to the modulation unit 102 at the time T1+Td. By doing this, the light component L is modulated in the modulation unit 102 by the drive signal DR2 representing a symbol K of the data signal D2. In other words, the light component L is modulated in the modulation unit 101 according to a symbol K of the data signal D1, and is then modulated in the modulation unit 102 according to a symbol K of the data signal D2. Here, the drive signal DR2 is delayed by the time Td with respect to the drive signal DR1, so the symbol K of the data signal D1 and the symbol K of the data signal D2 are accurately superimposed on each other. As a result, the characteristics of a modulated optical signal output from the optical modulator 10 are improved.

It is preferable that, in the configuration illustrated in FIG. 2, the length of a signal line between the phase adjustment circuit 20 and the multiplexer 31-1, and the length of a signal line between the phase adjustment circuit 20 and the multiplexer 31-2 be the same as each other. Further, it is preferable that the length of a signal line between the multiplexer 31-1 and the driver 41-1, and the length of a signal line between the multiplexer 31-2 and the driver 41-2 be the same as each other. Furthermore, it is preferable that the length of a signal line between the driver 41-1 and the modulation unit 101, and the length of a signal line between the driver 41-2 and the modulation unit 102 be the same as each other.

In the example illustrated in FIG. 2, the optical modulator 10 is driven by differential signals, but the embodiments of the present invention are not limited to this configuration. In other words, the optical modulator 10 may have a configuration in which a drive signal is applied to only one of the paired arms.

In the example illustrated in FIG. 2, a signal synchronized with a clock signal is generated using a multiplexer, but the embodiments of the present invention are not limited to this configuration. In other words, an electric signal synchronized with a clock signal may be generated without multiplexing the electric signal. Alternatively, an electric signal synchronized with a clock signal may be generated at the output side of a multiplexer.

Example of Phase Adjustment Circuit 20

Figure 7:
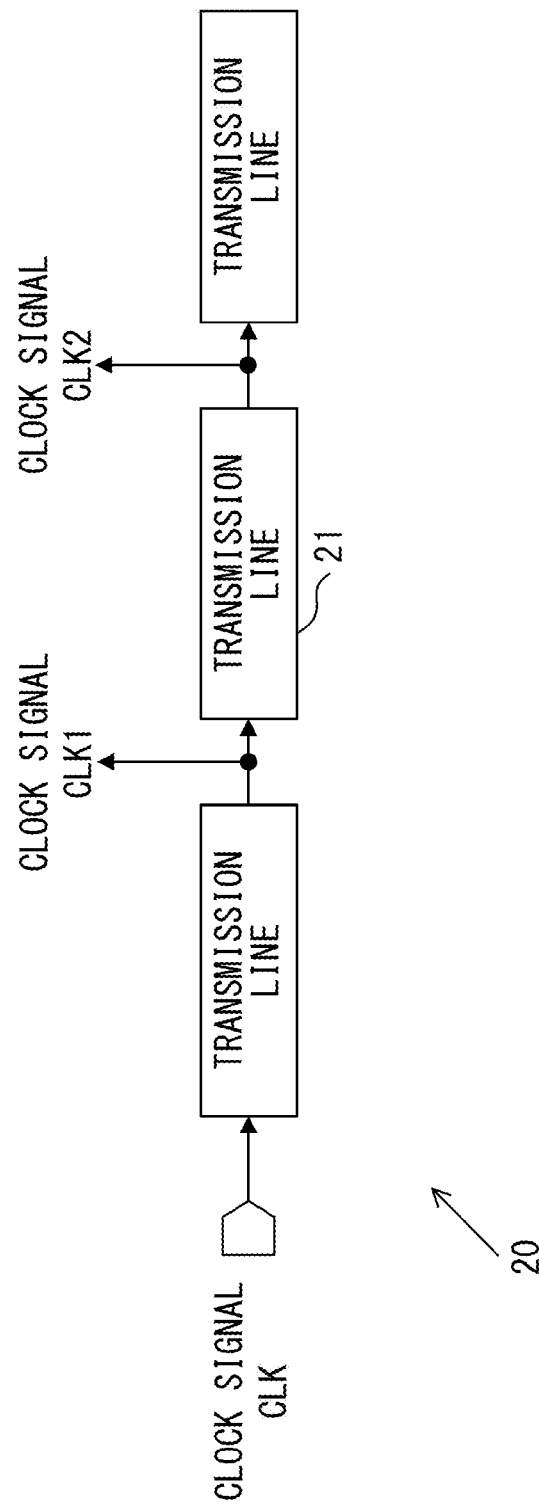

In the example illustrated in FIG. 7, a clock signal is delayed using a transmission line that propagates an electric signal. A transmission line 21 is formed by, for example, a conductor pattern that is formed on a substrate. The length of the transmission line 21 is determined such that a propagation time of light in the transmission line 21 is Td. This configuration does not include an active device, thus it is possible to reduce power consumption of the phase adjustment circuit 20.

Figure 8:
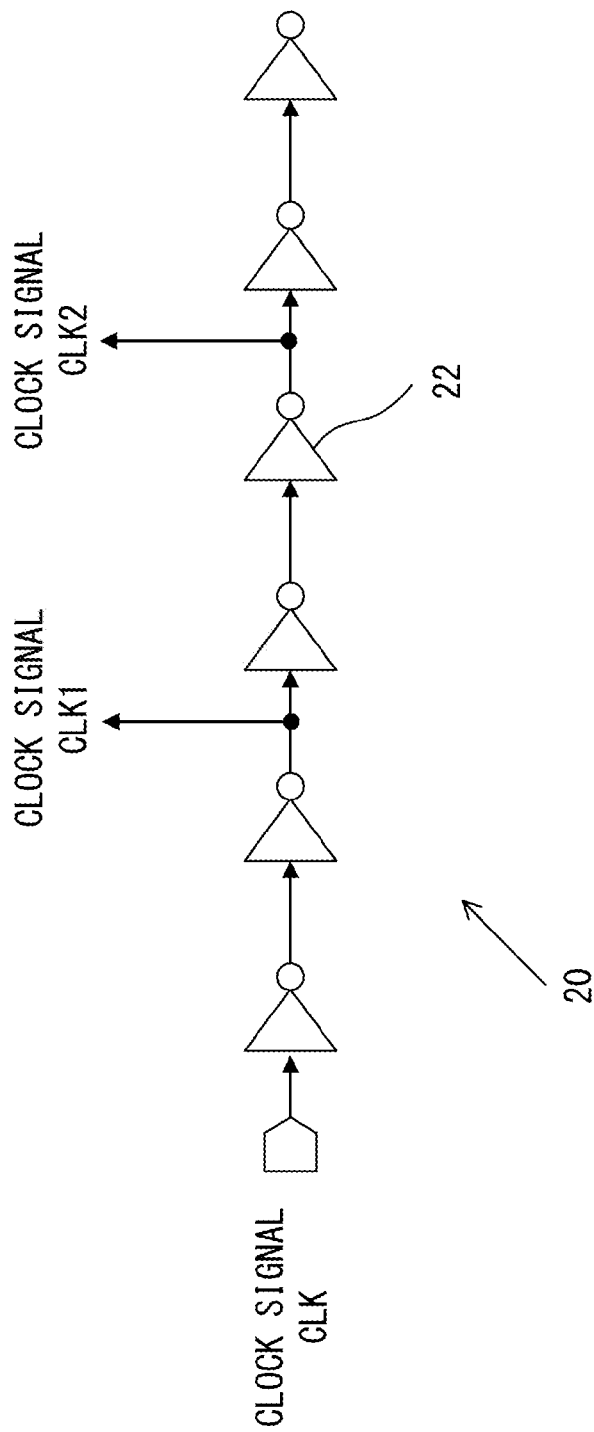

In the example illustrated in FIG. 8, a clock signal is delayed using an inverter device that inverts a logic of an electric signal. The delay time in an inverter device 22 can be designed to be a desired length. Thus, the number of invert devices 22 series-connected to one another is determined according to a delay time Td. For example, the phase adjustment circuit 20 is designed such that the product of a delay time in the inverter device 22 and the number of series-connected inverter devices 22 is Td. This configuration makes it possible to reduce the circuit area of the phase adjustment circuit 20. Note that in the configuration illustrated in FIG. 8, a buffer device may be implemented instead of an inverter device. The buffer device does not invert a logic of an electric signal.

Figure 9:
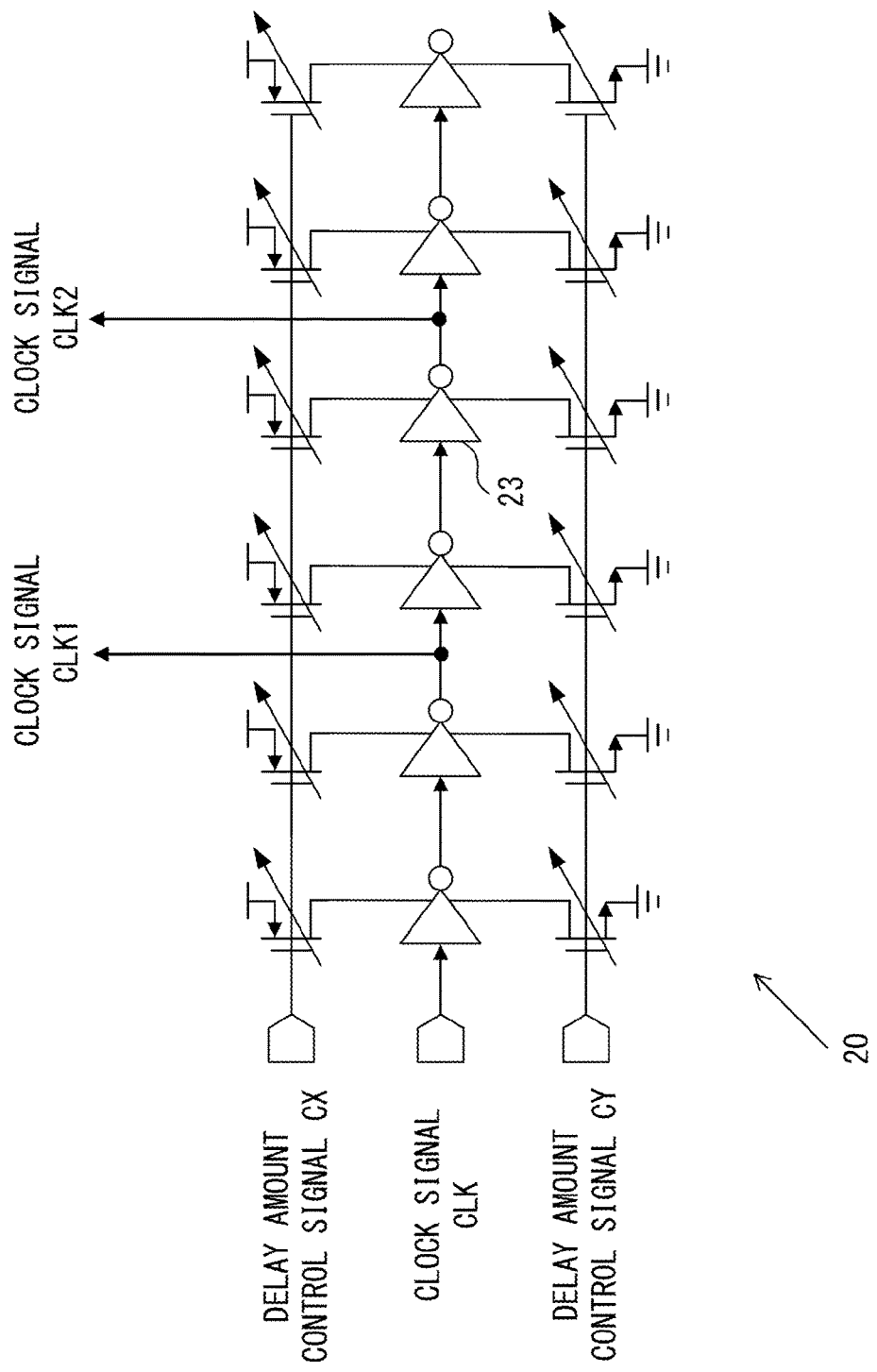

In the example illustrated in FIG. 9, a clock signal is delayed using a tri-state inverter. The delay time in a tri-state inverter 23 is controlled by delay amount control signals CX and CY. Specifically, the delay time in each tri-state inverter 23 is controlled such that the delay time of a clock signal CLK2 with respect to the clock signal CLK1 is Td. This configuration makes it possible to control the delay time of a clock signal CLK2 with respect to a clock signal CLK1. Note that in the configuration illustrated in FIG. 9, a tri-state buffer may be implemented instead of a tri-state inverter.

In the example illustrated in FIGS. 10A and 10B, a clock signal is delayed using a transistor pair differential amplifier. In this case, as illustrated in FIG. 10A, transistor pair differential amplifiers 24 are series-connected to one another. As illustrated in FIG. 10B, the delay time in each of the transistor pair differential amplifiers 24 is adjusted by controlling a bias current and/or a tail current. Specifically, a bias current and/or a tail current of each of the transistor pair differential amplifiers 24 are controlled such that the delay time of a clock signal CLK2 with respect to a clock signal CLK1 is Td. The bias current and/or the tail current of the transistor pair differential amplifier 24 are controlled by a delay amount control signal. This configuration makes it possible to control the delay time of a clock signal CLK2 with respect to a clock signal CLK1.

Figure 11:
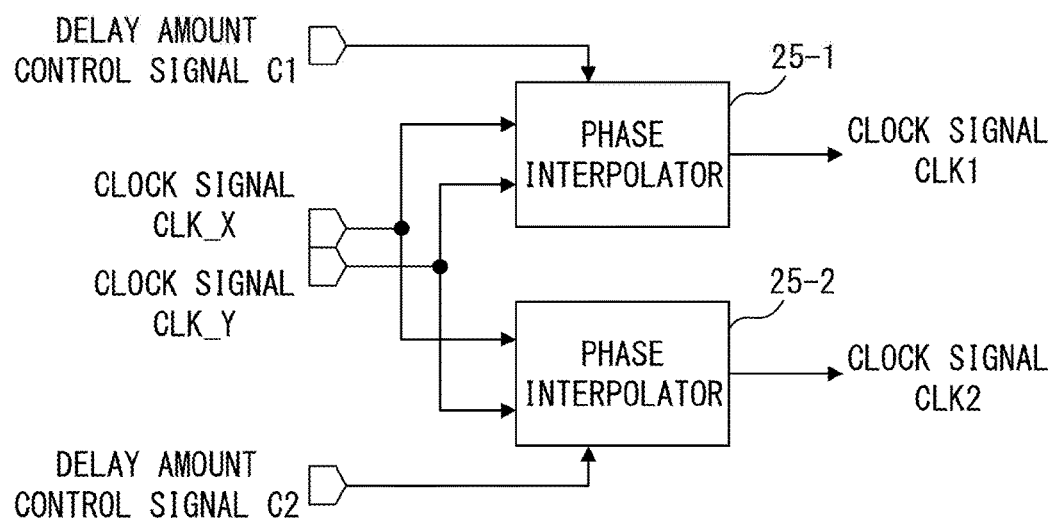

In the example illustrated in FIG. 11, a clock signal is delayed using a phase interpolator. For example, the phase adjustment circuit 20 includes phase interpolators 25-1 and 25-2. A clock signal CLK_X and a clock signal CLK_Y whose phases are different from each other are given to the phase adjustment circuit 20. Based on the clock signal CLK_X and the clock signal CLK_Y, the phase interpolator 25-1 can generate a clock signal CLK1 having a phase specified by a delay amount control signal C1. Likewise, based on the clock signal CLK_X and the clock signal CLK_Y, the phase interpolator 25-2 can generate a clock signal CLK2 having a phase specified by a delay amount control signal C2. Thus, in the configuration illustrated in FIG. 11, the delay amount control signals C1 and C2 are generated and given to the phase adjustment circuit 20, such that the delay time of a clock CLK2 with respect to a clock signal CLK1 is Td. This configuration makes it possible to control the delay time of a clock signal CLK2 with respect to a clock signal CLK1.

As described above, in the phase adjustment circuit 20 illustrated in FIGS. 9 to 11, the delay time of a clock signal CLK2 with respect to a clock signal CLK1 can be controlled according to a delay amount control signal. Thus, the phase adjustment circuit 20 may be configured to be controlled according to a modulated optical signal output from the optical modulator 10. For example, the state of the tri-state inverter 23 illustrated in FIG. 9, the state of the transistor pair differential amplifier 24 illustrated in FIGS. 10A and 10B, or the state of the phase interpolator 25-1,25-2 is adjusted by a feedback control such that the waveform of a modulated optical signal output from the optical modulator 10 is optimized (for example, such that the opening of an eye pattern of a modulated optical signal becomes wider). This feedback control is performed, for example, before the optical transmitter 1000 is shipped. Alternatively, this feedback control may be performed when the optical transmitter 1000 is in use.

Second Embodiment

Figure 12:
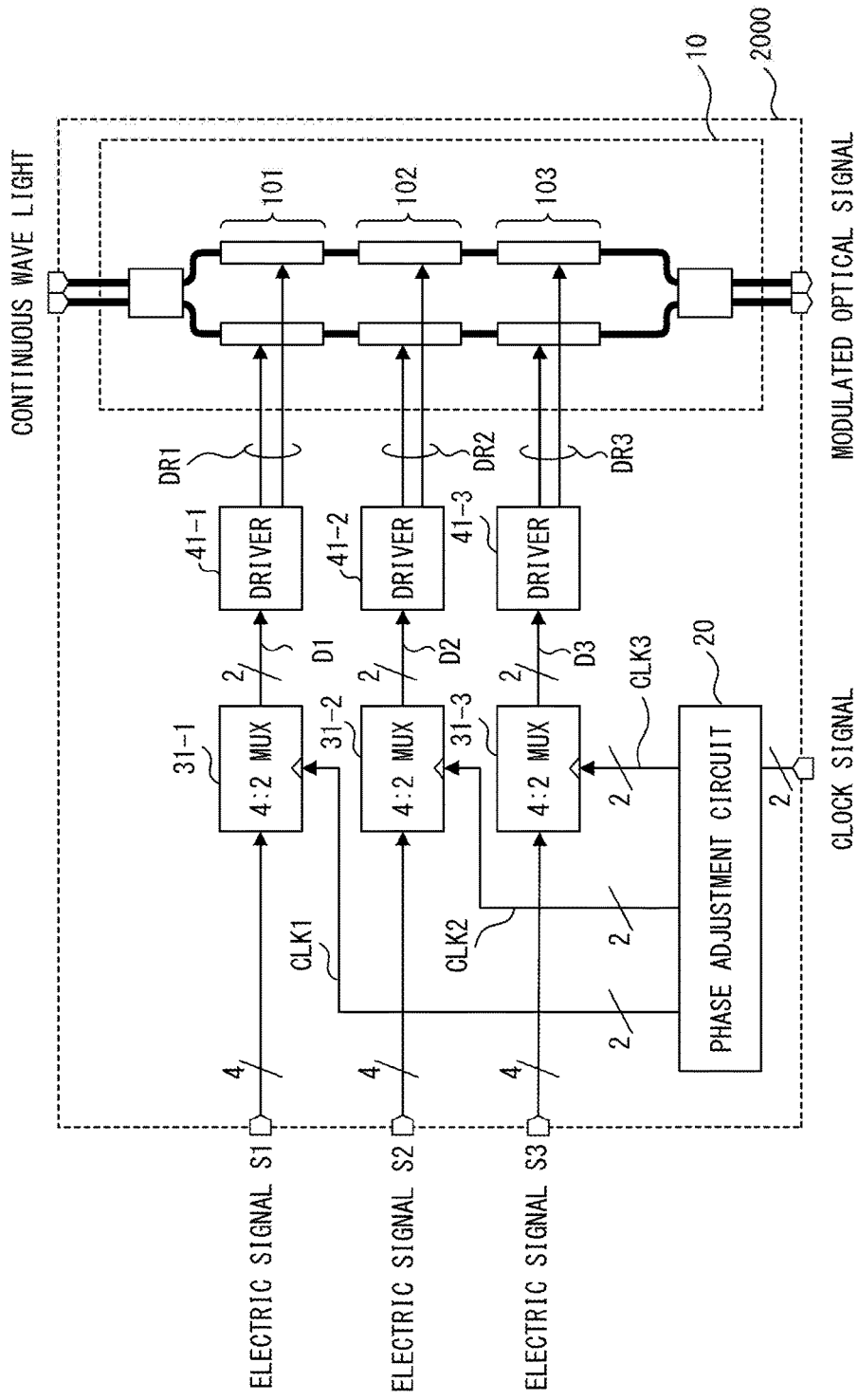
FIG. 12 illustrates an example of an optical transmitter according to a second embodiment of the present invention.

FIG. 12 illustrates an example of an optical transmitter according to a second embodiment of the present invention. In an optical transmitter 2000 according to the second embodiment, the optical modulator 10 includes three modulation units (101-103). The modulation unit 102 is provided at the output side of the modulation unit 101, and the modulation unit 103 is provided at the output side of the modulation unit 102. The lengths of the modulation units 101, 102, and 103 are the same as one another.

The timing at which light input to the optical modulator 10 arrives at the modulation unit 102 is delayed by a time Td1 with respect to the timing at which the input light arrives at the modulation unit 101. Further, the timing at which light input to the optical modulator 10 arrives at the modulation unit 103 is delayed by a time Td2 with respect to the timing at which the input light arrives at the modulation unit 2. In other words, the timing at which light input to the optical modulator 10 arrives at the modulation unit 103 is delayed by a time Td1+Td2 with respect to the timing at which the input light arrives at the modulation unit 101.

The phase adjustment circuit 20 generates clock signals CLK1 to CLK3 based on a clock signal CLK. The clock signal CLK2 is generated so as to be delayed by the time Td1 with respect to the clock signal CLK1. The clock signal CLK3 is generated so as to be delayed by the time Td2 with respect to the clock signal CLK2.

The multiplexers 31-1 to 31-3 respectively multiplex electric signals S1 to S3 in synchronization with the clock signals CLK1 to CLK3. In other words, the multiplexer 31-1 outputs a data signal D1 in synchronization with the clock signal CLK1, the multiplexer 31-2 outputs a data signal D2 in synchronization with the clock signal CLK2, and the multiplexer 31-3 outputs a data signal D3 in synchronization with the clock signal CLK3. The drivers 41-1 to 41-3 respectively generate drive signals DR1 to DR3 from output signals of the multiplexers 31-1 to 31-3 (that is, the data signals D1 to D3). Then, the drive signals DR1 to DR3 are respectively applied to the modulation units 101 to 103.

This configuration makes it possible to accurately superimpose a modulation by the drive signal DR1, a modulation by the drive signal DR2, and a modulation by the drive signal DR3 on one another. As a result, the characteristics of a modulated optical signal output from the optical modulator 10 are improved.

Further, in the configuration illustrated in FIG. 12, PAM4 can be realized by making the lengths of the modulation units 101 to 103 be the same as one another, and configuring the drivers 41-1 to 41-3 be the same as one another. Thus, this configuration makes it possible to design and adjust a circuit more easily if PAM4 is applied, compared to the configuration illustrated in FIG. 2.

Third Embodiment

FIG. 13 illustrates an example of an optical transmitter according to a third embodiment of the present invention. In an optical transmitter 3000 according to the third embodiment, the optical modulator 10 includes n modulation units (101 to 10n). n is an arbitrary integer greater than or equal to two. The modulation units 101 to 10n are sequentially provided from an input end to an output end of the optical modulator 10. In this example, the lengths of the modulations units 101 to 10n are the same as one another.

The phase adjustment circuit 20 generates clock signals CLK1, and CLK2 to CLKn based on a clock signal CLK. The clock signals CLK2 to CLKn are generated so as to be delayed by respective specified times with respect to the clock signal CLK1. In other words, a plurality of clock signals CLK1 to CLKn whose phases are different from one another are generated according to the arrangement of a plurality of modulation areas 101 to 10n. Specifically, when the difference between a time needed to propagate light from an input end of the optical modulator 10 to the modulation unit 101 and a time needed to propagate light from the input end of the optical modulator 10 to the modulation unit 10i is Ti (i=2, 3, . . . , n), the clock signal CLKi is delayed by the time Ti with respect to the clock signal CLK1.

The multiplexers 31-1 to 31-n respectively multiplex electric signals S1 to Sn in synchronization with the clock signals CLK1 to CLKn. In other words, data signals D1 to Dn are output in synchronization with the respective clock signals CLK1 to CLKn. The drivers 41-1 to 41-n respectively generate drive signals DR1 to DRn from output signals of the multiplexers 31-1 to 31-n. Then, the drive signals DR1 to DRn are respectively applied to the modulation units 101 to 10n.

This configuration makes it possible to accurately superimpose modulations by the drive signals DR1 to DRn on one another. As a result, the characteristics of a modulated optical signal output from the optical modulator 10 are improved. Further, the third embodiment makes it possible to apply a pulse-amplitude modulation of a desired number of bits per symbol (for example, PAM8 and PAM16) according to the value of n.

Fourth Embodiment

Figure 14:
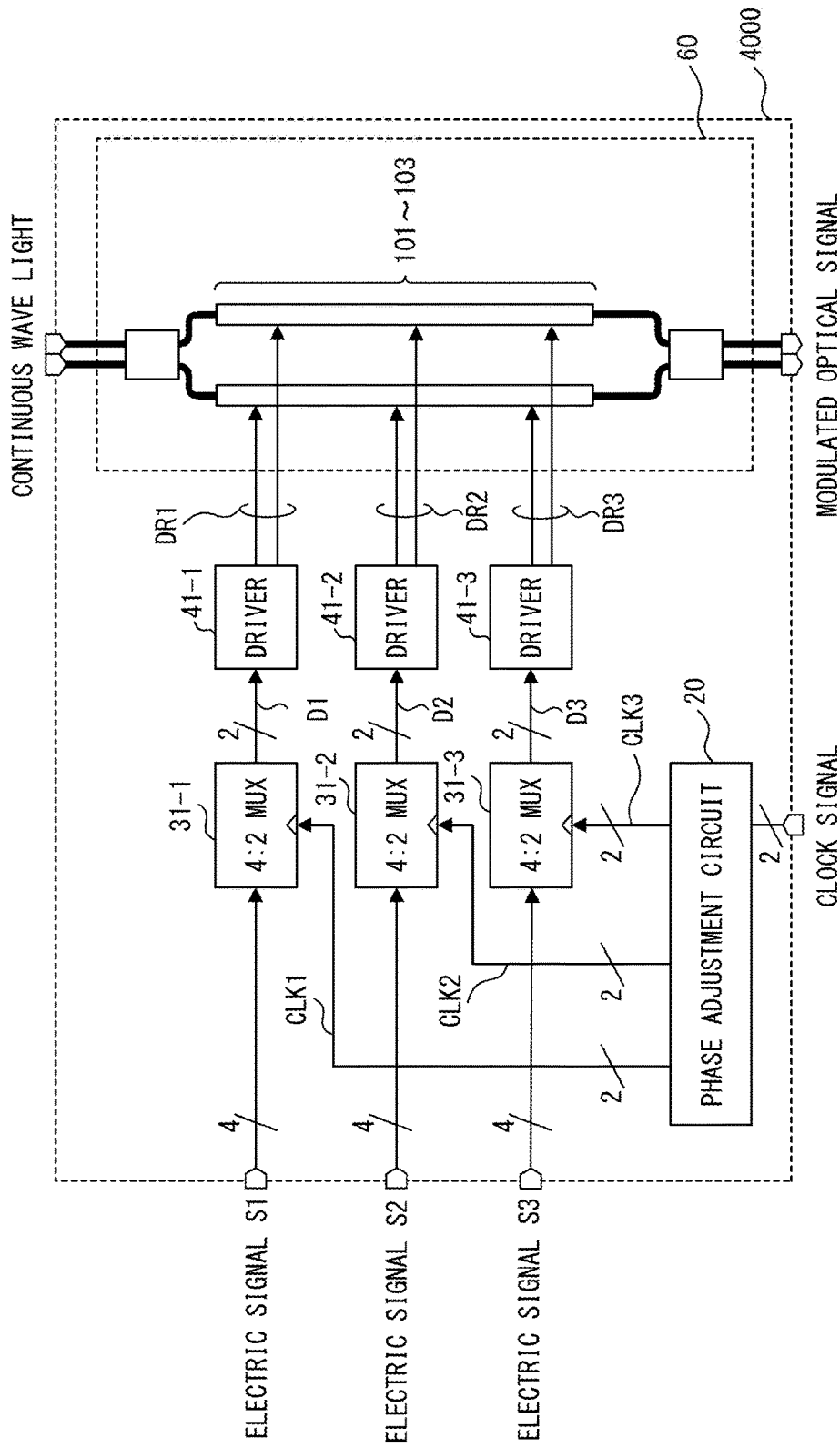
FIG. 14 illustrates an example of an optical transmitter according to a fourth embodiment of the present invention.

FIG. 14 illustrates an example of an optical transmitter according to a fourth embodiment of the present invention. As illustrated in FIG. 14, an optical transmitter 4000 according to the fourth embodiment includes an optical modulator 60, the phase adjustment circuit 20, the multiplexers 31-1 to 31-3, and the drivers 41-1 to 41-3. The phase adjustment circuit 20, the multiplexers 31-1 to 31-3, and the drivers 41-1 to 41-3 in the fourth embodiment illustrated in FIG. 14 are substantially the same as those in the second embodiment illustrated in FIG. 12.

Figure 15:
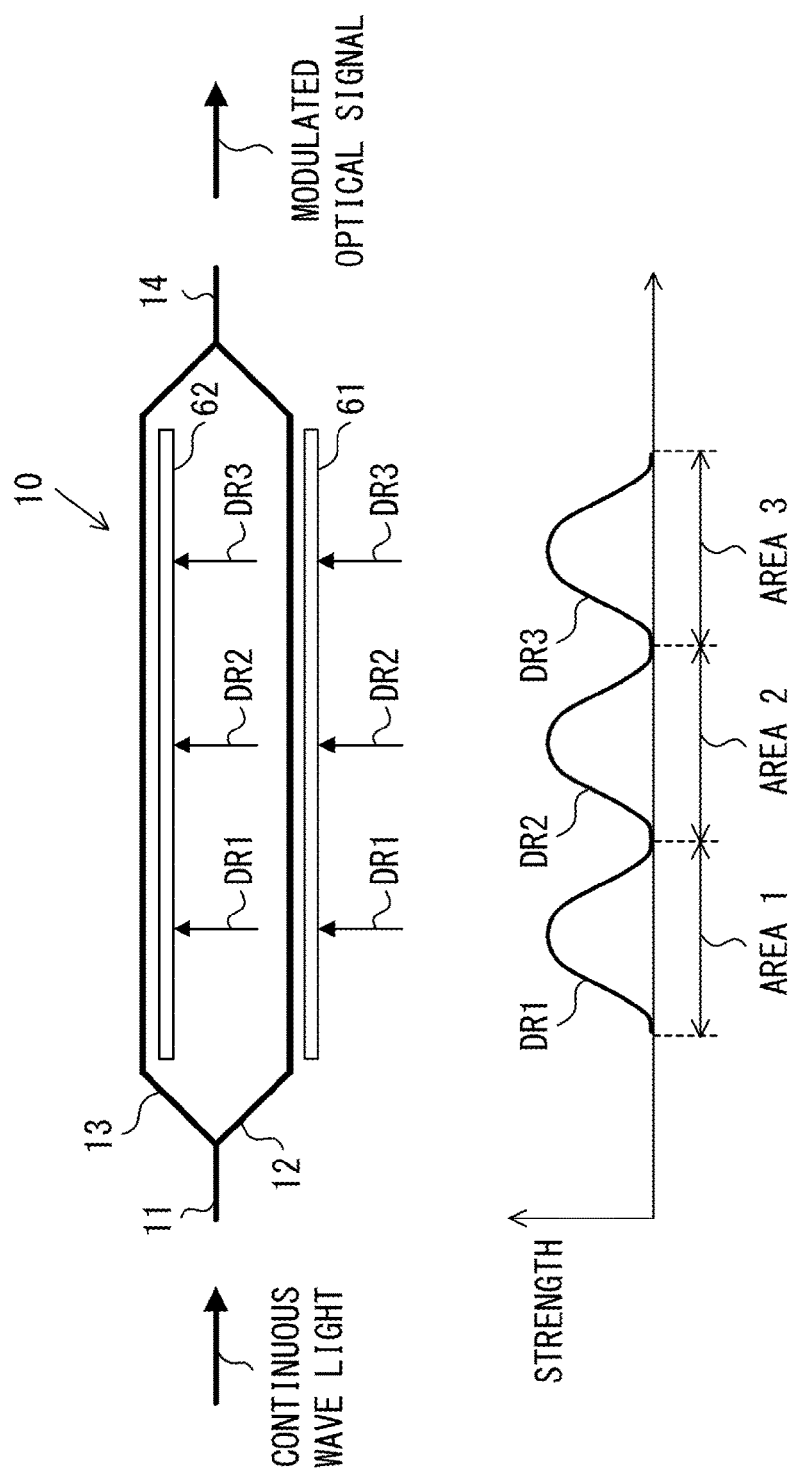
FIG. 15 illustrates an example of an optical modulator used in the fourth embodiment.

FIG. 15 illustrates an example of the optical modulator 60 used in the fourth embodiment. In the optical modulator 60, a signal electrode 61 is provided near the first arm optical waveguide 12, and a signal electrode 62 is provided near the second arm optical waveguide 13. Then, drive signals DR1 to DR3 are applied to the optical modulator 60. The drive signals DR1 to DR3 are generated similarly to the example illustrated in FIG. 12. Thus, the drive signal DR2 is delayed by a specified time with respect to the drive signal DR1, and the drive signal DR3 is delayed by a specified time with respect to the drive signal DR2.

The drive signals DR1 to DR3 are respectively applied to points that are physically different from one another. Specifically, the drive signal DR2 is applied to a point at the output side of the applied point of the drive signal DR1, and the drive signal DR3 is applied to a point at the output side of the applied point of the drive signal DR2, as illustrated in FIG. 15. The delay time of a clock signal CLK2 with respect to a clock signal CLK1 corresponds to a distance between the applied point of the drive signal DR1 and the applied point of the drive signal DR2. The delay time of a clock signal CLK3 with respect to the clock signal CLK2 corresponds to a distance between the applied point of the drive signal DR3 and the applied point of the drive signal DR3.

The drive signals DR1 to DR3 applied to the optical modulator 10 are attenuated when they are propagated through the signal electrodes 61 and 62. Thus, as illustrated in FIG. 15, the interference between the drive signals DR1 to DR3 is small in the signal electrodes 61 and 62. Thus, the modulation units 101 to 103 can modulate propagated light substantially independently of one another. In other words, an area (an area 1) that is located around the applied point of the drive signal DR1 works as the modulation unit 101 illustrated in FIG. 12. An area (an area 2) that is located around the applied point of the drive signal DR2 works as the modulation unit 102 illustrated in FIG. 12. An area (an area 3) that is located around the applied point of the drive signal DR3 works as the modulation unit 103 illustrated in FIG. 12.

In the example illustrated in FIGS. 14 and 15, a set of three drive signals DR1 to DR3 are applied to an optical modulator, but the fourth embodiment is not limited to this configuration. In other words, any number of drive signals may be given to the optical modulator in a configuration in which an electrode provided near each arm of the optical modulator is not divided into a plurality of electrodes.

The phase adjustment circuit 20 illustrated in FIGS. 7 to 11 is also applicable to the second, third, and fourth embodiments. In the configurations illustrated in FIGS. 7 to 10B, each clock signal is generated from another clock signal. For example, a clock signal CLK1 is generated from a clock signal CLK, a clock signal CLK2 is generated from the clock signal CLK1, and a clock signal CLK3 is generated from the clock signal CLK2. In the configuration illustrated in FIG. 11, clock signals CLK1 to CLKn are generated from two input clock signals CLK_X and CLK_Y.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmitter comprising:
    an optical modulator equipped with a first arm and a second arm, the first arm including a first modulation area and a second modulation area that is provided at output side of the first modulation area, and the second arm including a third modulation area and a fourth modulation area respectively corresponding to the first modulation area and the second modulation area;
    a phase adjustment circuit configured to adjust a phase of a first clock signal so as to generate a second clock signal;
    a first synchronization circuit configured to output a first electric signal in synchronization with the first clock signal;
    a second synchronization circuit configured to output a second electric signal in synchronization with the second clock signal;
    a first drive circuit configured to drive the first modulation area and the third modulation area with the first electric signal output from the first synchronization circuit; and
    a second drive circuit configured to drive the second modulation area and the fourth modulation area with the second electric signal output from the second synchronization circuit,
    the first synchronization circuit includes a first multiplexer configured to multiplex a first parallel signal so as to generate the first electric signal, and to output the first electric signal in synchronization with the first clock signal, and
    the second synchronization circuit includes a second multiplexer configured to multiplex a second parallel signal so as to generate the second electric signal, and to output the second electric signal in synchronization with the second clock signal.

2. An optical transmitter comprising:
    an optical modulator equipped with a first arm and a second arm, the first arm including a first modulation area and a second modulation area that is provided at output side of the first modulation area, and the second arm including a third modulation area and a fourth modulation area respectively corresponding to the first modulation area and the second modulation area;
    a phase adjustment circuit configured to adjust a phase of a first clock signal so as to generate a second clock signal;
    a first synchronization circuit configured to output a first electric signal in synchronization with the first clock signal;
    a second synchronization circuit configured to output a second electric signal in synchronization with the second clock signal;
    a first drive circuit configured to drive the first modulation area and the third modulation area with the first electric signal output from the first synchronization circuit; and
    a second drive circuit configured to drive the second modulation area and the fourth modulation area with the second electric signal output from the second synchronization circuit,
    the phase adjustment circuit adjusts the phase of the first clock signal such that the first clock signal is delayed by a time corresponding to a difference between a time needed to propagate light from an input end of the optical modulator to the first modulation area, and a time needed to propagate the light from the input end of the optical modulator to the second modulation area, so as to generate the second clock signal.

3. An optical transmitter comprising:
    an optical modulator equipped with a first arm and a second arm, the first arm including a first modulation area and a second modulation area that is provided at output side of the first modulation area, and the second arm including a third modulation area and a fourth modulation area respectively corresponding to the first modulation area and the second modulation area;

a phase adjustment circuit configured to adjust a phase of a first clock signal so as to generate a second clock signal;

a first synchronization circuit configured to output a first electric signal in synchronization with the first clock signal;

a second synchronization circuit configured to output a second electric signal in synchronization with the second clock signal;

a first drive circuit configured to drive the first modulation area and the third modulation area with the first electric signal output from the first synchronization circuit; and a second drive circuit configured to drive the second modulation area and the fourth modulation area with the second electric signal output from the second synchronization circuit, wherein the phase adjustment circuit controls a delay time of the second clock signal with respect to the first clock signal according to a waveform of a modulated optical signal output from the optical modulator.

4. An optical transmitter comprising:

an optical modulator including a first modulation area and a second modulation area that is provided at output side of the first modulation area;

a phase adjustment circuit configured to adjust a phase of a first clock signal so as to generate a second clock signal;

a first synchronization circuit configured to output a first electric signal in synchronization with the first clock signal;

a second synchronization circuit configured to output a second electric signal in synchronization with the second clock signal;

a first drive circuit configured to drive the first modulation area with the first electric signal output from the first synchronization circuit; and a second drive circuit configured to drive the second modulation area with the second electric signal output from the second synchronization circuit, the phase adjustment circuit adjusts the phase of the first clock signal such that the first clock signal is delayed by a time corresponding to a difference between a time needed to propagate light from an input end of the optical modulator to the first modulation area, and a time needed to propagate the light from the input end of the optical modulator to the second modulation area, so as to generate the second clock signal.

5. An optical transmitter comprising:

an optical modulator including N modulation areas, N being an integer that is greater than two, the N modulation areas being arranged in series between the input end of the optical modulator and the output end of the optical modulator;

a phase adjustment circuit configured to generate, according to the arrangement of the N modulation areas in the optical modulator, N clock signals whose phases are different from one another;

a synchronization circuit configured to output N electric signals that are respectively synchronized with the N clock signals; and a drive circuit configured to drive the N modulation areas with the respective N electric signals output from the synchronization circuit, when the difference between a time needed to propagate light from an input end of the optical modulator to a first modulation area in the N modulation areas and a time needed to propagate the light from the input end of the optical modulator to i-th modulation area in the N modulation areas is $T_i$, i being an integer that is between two and N, the phase adjustment circuit generates the N clock signals such that the i-th clock signal is delayed by the time $T_i$ with respect to the first clock signal.

* * * * *